United States Patent
Monck et al.

(10) Patent No.: US 6,952,162 B2
(45) Date of Patent: Oct. 4, 2005

(54) MULTIDIRECTIONAL CLUSTER LIGHTS FOR MOTOR VEHICLES

(76) Inventors: Joan M. Monck, 5 Spruce La., Warren, NJ (US) 07059; Paul Monck, 8 Crestwood Dr., Randolph, NJ (US) 07869; Michael M. Monck, 119 Church St., Damariscotta, ME (US) 04543

( * ) Notice: Subject to any disclaimer, the term of this patent is extended or adjusted under 35 U.S.C. 154(b) by 0 days.

(21) Appl. No.: 10/625,058

(22) Filed: Jul. 24, 2003

(65) Prior Publication Data

US 2005/0017862 A1 Jan. 27, 2005

(51) Int. Cl.$^7$ .................................................. B60Q 1/50
(52) U.S. Cl. ........................ 340/464; 340/465; 340/468; 340/475
(58) Field of Search ................................ 340/463–465, 340/468, 472, 473, 475, 479, 480, 483

(56) References Cited

U.S. PATENT DOCUMENTS

| | | |
|---|---|---|
| 1,288,747 A | 12/1918 | Theim et al. |
| 1,300,893 A | 4/1919 | Stover |
| 1,337,872 A | 4/1920 | Zahnow |
| 1,345,557 A | 7/1920 | Shane |
| D70,770 S | 8/1926 | Martin |
| D70,960 S | 8/1926 | Isaac |
| D91,190 S | 12/1933 | George |
| 1,948,050 A | 2/1934 | Rossi ......................... 177/329 |
| 1,998,691 A | 4/1935 | Stanton ...................... 176/124 |
| D97,887 S | 12/1935 | Andrews |
| 2,031,154 A | 2/1936 | Fuchs ......................... 177/329 |
| 2,060,401 A | 11/1936 | Smith ......................... 177/329 |
| 2,062,993 A | 12/1936 | Haines ....................... 177/329 |
| 2,084,252 A | 6/1937 | Hallenberg .................. 40/133 |
| 2,131,962 A | 10/1938 | McAlpin ..................... 177/329 |
| 2,134,313 A | 10/1938 | Nordgran .................... 177/327 |
| D121,063 S | 6/1940 | Bruderick |
| 2,825,888 A | 3/1958 | Oldenburg ................... 340/87 |
| 4,495,553 A | 1/1985 | Haynes ....................... 362/311 |
| 4,556,862 A | 12/1985 | Meinershagen ............. 340/67 |
| 4,622,494 A | 11/1986 | Johnson ...................... 315/77 |
| 4,801,917 A | 1/1989 | Winterfeld ................... 340/81 R |
| 4,808,968 A * | 2/1989 | Caine ......................... 340/479 |
| 4,868,719 A * | 9/1989 | Kouchi et al. ............. 362/545 |
| 4,954,808 A | 9/1990 | Duerkob ..................... 340/475 |
| 5,073,768 A * | 12/1991 | Willaredt .................... 340/475 |
| 5,097,612 A * | 3/1992 | Williams ..................... 40/591 |
| 5,900,813 A | 5/1999 | Ruminski et al. .......... 340/475 |
| 6,243,008 B1 * | 6/2001 | Korabiak .................... 340/463 |
| 2001/0014025 A1 | 8/2001 | Hymer ....................... 362/541 |
| 2002/0012251 A1 | 1/2002 | Lee ............................ 362/540 |

OTHER PUBLICATIONS

K&R Distributing, Inc.—Arrow Light Kit found at http://www.krdist.com/arrowlt.htm.

* cited by examiner

*Primary Examiner*—Brent A. Swarthout
(74) *Attorney, Agent, or Firm*—Ernest D. Buff & Associates, LLC; Ernest D. Buff; Theodore J. Pierson

(57) ABSTRACT

A Multi-Directional Clustered Signal Light system for land vehicles is incorporated on opposing sides of a land vehicle's front and rear bumpers. The system signals the driver's intention to turn left, move forward or turn right by illuminating arrows within the cluster light. The left and right turn lighted arrows are color-coded and flash until the steering wheel is straightened upon completion of a turn. The move forward lighted arrow indication is color-coded and remains on for a period of about 0.5 minute to 1 minute. The system signals nearby drivers and pedestrians, to inform them concerning the vehicle's intended direction of movement. Safety margins are improved and accidents otherwise resulting from miscommunication between drivers are virtually eliminated. The signal light is connected using a single connector and installed as a single unit, thereby facilitating cost effective installation and replacement.

12 Claims, 3 Drawing Sheets

MULTIDIRECTIONAL CLUSTER LIGHTS FOR MOTOR VEHICLES

BACKGROUND OF THE INVENTION

1. Field of the Invention

The present invention relates to signal-light systems for land vehicles; and more particularly to a clustered multidirectional signal-light system wherein a plurality of directional arrow lights powered by a single connection render the system especially well suited for installation in the front and/or rear bumpers of a vehicle.

2. Description of the Prior Art

Many approaches have been disclosed in the prior art for installing directional, brake and back up lights in motor vehicles. These lights may be placed at various locations on a vehicle and placing these lights at prominent locations increases safety.

U.S. Pat. No. 1,288,747 to Thiem et al. discloses a Traffic Signal Lamp. A signaling device is mounted on the mud guard in the front and rear of the car to indicate to a traffic officer or pedestrians whether the driver intends to go forward, turn right or left or stop. An arrow-indicating device is mechanically rotated by a rack and pinion drive actuated by the driver to point the arrow in the direction of travel. A lower arrow position indicates that the vehicle is stopping. A central lamp is provided for illumination of the arrows. The stopping arrow points downwards and is likely to be misinterpreted as indicating that the vehicle gearshift has been placed in reverse. The arrow is moved into these positions by actuating a cable, which is connected to a rack and pinion device that turns the arrow attached on a sleeve. The driver manually actuates this rotation of the arrow. The system is subject to jamming, which results in improper location of the arrow, providing false indications of vehicle movement. The system provides no indication that the vehicle is moving, unless it is effecting a left or right-hand turn.

U.S. Pat. No. 1,300,893 to Stover discloses an automobile signal. Motion of a lever into one of four positions activates the signal. The positions activate lights in the rear bumper; thereby signaling left turn, constant speed green light, brake or stoplight and right turn light. The constant speed green light is always lit indicating that the vehicle is moving at constant velocity, and the green light goes out when the vehicle speed is reduced. This device only produces indications on the rear bumper, and each indicator is a separately wired light bulb placed within a bumper cavity. There is no indication that the vehicle may be moving without turning left or right.

U.S. Pat. No. 1,337,872 to Zahnow discloses a combined collision buffer and direction indicator for vehicles. A channel member functions as a buffer. It carries three sets of lights within recessed compartments that indicate left-turn, stop and right-turn. The words 'LEFT', 'STOP' and 'RIGHT' are spelled out on the bumper. The channel bumper containing the indicator lights may be placed to the front and rear of the vehicle. The driver using a three-position switch activates it. These indicator lights are individually wired. No indication of vehicle movement is provided by the system unless the vehicle is turning to the left or right.

U.S. Pat. No. 1,345,557 to Shane discloses an automobile signal system. Three indicators signaling left-turn, stop and right-turn are placed at the rear of the vehicle above the license plate. The driver manually activates one of three switches to activate a particular indicator. A small glow lamp by the side of the switch indicates to the driver that the indicator light has been turned on. Each bulb in the indicator is individually wired to the battery and the switch. Indicators are only placed at the rear of the vehicle. Also, there is no indication that the vehicle may be moving without turning left or right.

U.S. Pat. No. 1,948,050 to Rossi discloses a vehicle directional signal. The patent discloses a two-part clamp attachment that embraces the casing of the taillight to provide clear indications for left and right-hand turn signals. No disclosure is contained concerning use of signal indicators at the front of a vehicle. Each of the directional indicating bulbs disclosed must be separately wired. No signal indicator is provided to signify that the vehicle is moving unless the vehicle is turning left or right.

U.S. Pat. No. 1,998,691 to Stanton discloses a signal and display device. Two gas filled tubes provide left-turn or right-turn illuminated signals. Such tubes are placed within the license plate holder of a vehicle. The gas filled tubes are provided with heating elements to allow them to be turned on in a cold climate. A plurality of turn switches are activated automatically when the steering wheel is turned to the left or right. Gas-filled tubes tend to become unreliable devices, especially when vibrations are present. Moreover, they require high voltages. Gas-filled tubes must be individually wired through the steering wheel. The signal and display device disclosed provides no directional indicators in front of the vehicle; the only directional indicators provided are placed solely at the rear of the vehicle. In addition, the unit disclosed provides no indication that the vehicle may be moving without turning left or right.

U.S. Pat. No. 2,031,154 to Fuchs discloses a license plate holder for automobiles, which combines taillight and directional signal indicators. Bulbs 15 L and 15R signal left and right turns, while bulb 16 functions as a taillight and bulb 17 functions as a brake or stop light. Each of these bulbs must be individually wired. There are no directional indicators in front of the vehicle. Rather, the directional indicators disclosed are placed solely on the rear license plate. In addition, there is no indication that the vehicle may be moving without turning left or right.

U.S. Pat. No. 2,060,401 to Smith discloses a direction signal. A direction indication signal is mounted inside the vehicle below the rear view mirror, as well as below the license plate in the rear of the vehicle. Tilting a snap switch mounted in the steering wheel activates the left or right turn indication on both the indicator lights below the rear view mirror and below the license plate. No indication is provided by the system that the vehicle may be moving without turning left or right.

U.S. Pat. No. 2,062,993 to Haines discloses a fender signal arrow and parking lamp. The lamp housing comprises two parts, each having its own bulb. The upper part is used for a parking light, while the lower part is used to provide left or right turn indications. The left lamp housing is connected to a left turn signal. The right lamp housing is connected to a right turn signal and carries appropriate arrows. No indication is provided by the system concerning movement unless the vehicle is turning left or right.

U.S. Pat. No. 2,084,252 to Halenberg discloses an automobile indicator. The indicator is attached to front or rear windshields to provide left or right turn indications, which are readily visible. The indicators are arrow shaped and carry a single light bulb. A pair of toggle switches in the steering column energizes the bulbs. The lights in the windshields of the system disclosed may not be clearly visible to other drivers, and may be mistaken for other decorative devices. There is no indication that the vehicle may be moving unless it is turning left or right.

U.S. Pat. No. 2,131,962 to McAlpin discloses, in combination, a license plate and direction signal for motor vehicles. Direction and brake light indicators located above the license plate comprise left right turn signals and a central brake light signal. When the brake pedal is pressed, the brake lamp is energized through the normally closed contact of switch 35 and switch 34. Activating switch 35 to left or right turns on left arrow 30 or right arrow 31. Each of the signal bulbs has to be individually wired. There is no turn indication displayed at the front of the vehicle; and no indication is communicated that a turn is about to be made.

U.S. Pat. No. 2,134,313 to Nordgran discloses an automobile or highway-signal to indicate left or right turn or a stop signal using a neon tube and an incandescent bulb. The base plate has four compartments: one for left turn signal; one for stop signal; one for tail light; and one for right turn signal. In all compartments, both neon tubes and incandescent bulbs are provided for additional safety. The circuit closer is mounted on the steering wheel to indicate left and right turns when the steering wheel is turned. Energizing a switch on the steering wheel or brake pedal turns on the lights. The indicating device disclosed is mounted on the back of the vehicle and there is no signal indicator at the front of the vehicle. Also, when no turn is intended by the driver of the vehicle disclosed no signal or like indication is provided. Use of neon tubes and incandescent wiring of the type disclosed requires twice the amount of wiring.

U.S. Pat. No. 2,825,888 to Oldenburg discloses turn signals for vehicle bodies. The turn signals are disposed on a side and end wall at 40 and 42 of a truck or bus vehicle body to provide high visibility indication for vehicles in front of and behind the bus or truck. Due to the length of these vehicles, it is difficult to see a turn signal, which is positioned in front of the truck or bus. Providing turn signals, which are disposed on the side and end walls of a bus or truck provides a higher degree of visibility for the turn signals. Each of the bulbs of the system disclosed has to be individually wired. There is no indication concerning intended forward motion of the vehicle during traverse of multiple way intersections.

U.S. Pat. No. 4,495,553 to Haynes discloses a vehicle light assembly particularly for motorcycles. An arrow shaped turn signal housing can be mounted in place of a conventional housing to provide a safer turn signal light containing a direction-pointing arrow. The patent discloses a vehicle light assembly particularly suited for motorcycles, wherein an arrow shaped light assembly slips over a conventional circular directional signal assembly. With this arrangement, there is provided a safer directional assembly that directs the intended motion using an arrow. This device does not have any indications in front of the motorcycle.

U.S. Pat. No. 4,556,862 to Meinershagen discloses a vehicle direction signal and slow warning system that employs a moving pattern of simultaneously ON lamps. A signaling device consists of single or multiple rows or banks of light bulbs extending the entire width on the front and rear of a vehicle. The bulbs are alternately turned on and off in a precise, timed, sequential manner so as to provide the visual effect of a row of lights moving or traveling in either the right-hand or left-hand direction. Upon activation of the brake pedal, the display of light rows at the vehicle's rear divides its traveling or running effect from the centerline toward both the right-hand and left-hand sides simultaneously, giving the visual effect of the rear bank of lights coming toward the observer. Due to the use of multiple rows of lights, the patterns of lights may be staggered or sequenced to create vertical bars, chevron-shaped arrows, or diagonal bars of light moving in the direction desired. The system disclosed requires a large number of bulbs, each of which must be individually wired to a timing control board. There is no signal indication provided for forward motion.

U.S. Pat. No. 4,622,494 to Johnson discloses a signaling device for large vehicles, which usually make wide turns. This auxiliary signaling and warning device comprises a main body section that is at least partially reflectorized with a light bulb and a light lens member that is secured to the main body section to form an enclosure. The light lens member is provided with a written message indicating that the vehicle negotiates wide turns. Electrical connections from the light bulbs are adapted to interact with the existing vehicle directional turn signal lights. The enclosure is adapted for mounting to the rear of the vehicle so as to provide a highly visible flashing warning to following traffic. This wide-turn auxiliary signaling and warning device must be individually wired to existing light systems in the vehicle. No indication is provided if no turn is made.

U.S. Pat. No. 4,801,917 to Winterfeld discloses a turn signal apparatus for use in conjunction with agricultural vehicles. A plurality of signaling devices is magnetically securable to a drawn vehicle, such as a trailer, and is controlled by a remote-control switching device. The signaling devices are formed with permanent magnets upon a rearward-facing surface enabling the signaling apparatus to be readily repositioned upon a variety of utility vehicles. This device uses battery power, which is consumed rapidly. There is no indication for forward motion of the towed vehicle.

U.S. Pat. No. 4,954,808 to Duerkob discloses an eye level rear mounted lighted turn and stop signal for vehicles. The unit includes an elongated housing with end compartments and an intermediate compartment, with the rear side open. A light is provided in each compartment. Lights in the end compartments are electrically connected to the automobile left and right turn signal indicators, while the light in the intermediate compartment is electrically connected to the automobile brake pedal. An elongated material strip with arrow-shaped left-turn and right-turn openings extends across the open sides of the compartment and is associated with covered lens covers for the open side of each compartment. Upon operating either the left or right turn indicators and/or the brake pedal of the automobile, the lights in the compartments will project a light beam through the left-turn or right-turn arrow-shaped openings or the elongated intermediate opening of the elongated material strip, to provide early advanced warning to following vehicles regarding vehicle turning or stopping. This eye level mounted light provides better warning of the intended movement of a vehicle. Such an eye level device represents an additional component set over and above the standard components on a vehicle, and needs additional wiring to each bulb from their corresponding lighting circuits.

U.S. Pat. No. 5,900,813 to Ruminski et al. discloses a vehicle turn signal for warning against wide turns, having a placard with a warning printed thereon. The placard also has mounted thereon a strobe lamp and a plurality of light-emitting mechanisms, the light-emitting mechanisms being arranged to form an arrow. The control circuit is arranged such that the light-emitting mechanisms forming the arrow are sequentially and cyclically illuminated beginning with the light-emitting mechanisms forming the tail of the arrow and preceding to the light-emitting mechanisms forming the head of the arrow. The strobe lamp is cyclically illuminated in conjunction with the light-emitting mechanisms forming the arrow. A manually operable switch located adjacent a driver of a vehicle activates a control circuit for the vehicular wide turn warning device. By operating the manually operable switching means the control circuit is activated and the vehicular wide turn warning device operates so as to inform motorists of an imminent wide turn to be performed by the vehicle upon which the vehicular wide turn warning devices are mounted. No disclosure is contained within the patent concerning a left-turn, a right-turn, no-turn indicating device. This device is supplied in addition to other equipment provided by the vehicle manufacturer. Additional wiring and circuitry must be connected in order to activate the device.

U.S. patent application Ser. No. 2001/0014025 to Hymer discloses high signal lights for automotive vehicles, which signal braking, deceleration, and turning of the vehicle or an emergency situation. These indicators at high locations are wired using connections other than those of the existing light systems in the vehicle; and require additional wiring elements and connections. Moreover, the piezo-electric deceleration sensor and its handling need to be wired accordingly. No disclosure is contained by the patent concerning movement of the vehicle in a forward direction without making a left-hand or right-hand turn. Signal lights are mounted in high places, not on the front and back bumper.

U.S. patent application Ser. No. 2002/0012251 discloses an L-shaped lighting directional sign for a vehicle signal light. An additional set of lights is wired using connections other than those of existing lights on the vehicle. Moreover, the additional set of lights must be wired according to their functionality. In addition, the auxiliary lights disclosed by the patent application are positioned at a high point, not in the front and back bumpers of the automobile.

Internet Publication K&R Distributing at http://www.krdistcom/arrowlt.htm discloses an agricultural implement arrow light kit. Such a kit is not an automobile light; and does not indicate left turn, right turn and intended forward motion.

There remains a need in the art for a clustered multidirectional light-signaling system for land motor vehicles adapted for installation in the front and/or rear bumpers of a vehicle that communicates intended movement of left turn, right turn or forward motion of a vehicle to drivers of all surrounding vehicles. There is also a need for a light-signaling system that can be easily installed by automobile manufacturers at reduced cost or easily replaced in one single operation by car owners with easy connections to multi-directional lights. None of the prior art disclosures provide a solution for this problem. There is a strong need for multi-directional signal indicators that not only indicate intended motion to the right or left direction, but also signal indicated movement without making any turns; such indicated movement should be communicated to all vehicles in the near surroundings of the signaling vehicle.

SUMMARY OF THE INVENTION

The present invention provides a Multi-Directional Clustered Signal Light system for land vehicles that locates and incorporates cluster lights in each side of the front and rear bumpers of a land vehicle, providing superior visibility for driver-activated signal to drivers of surrounding vehicles.

Each cluster lamp includes three lighted arrows for left turn indication; move forward indication and right turn indication. Moreover, each of the lighted arrows may be color coded for ready recognition by drivers of surrounding vehicles. The left turn arrow may be color-coded blue and will flash to indicate a left-hand turn. The signal is activated by a three-position switch wherein the left turn and right turn positions latch while the move-forward position is non-latching. When the left turn or right turn motion is complete as indicated by steering wheel position, the latching action is released, turning off the left and right turn flashing indication lighted arrows. The right turn arrow may be color-coded red and will flash to indicate a right-hand turn. When the driver intends to move forward instead of turning in the left or right direction, activation of the signal switch turns on the central arrow, which may be colored green, and stays on as a steady non-flashing light for a period of 0.5 to 1 minute. This steady central lighted arrow indicates to all drivers of surrounding vehicles the intention of the driver to move forward. A central powering unit with wiring that is connected to all cluster lights powers the cluster light. At each cluster unit the wiring terminates on an easy to install connecting unit which includes a common ground connection and three connections to left turn, forward and right turn indication lights. The connecting unit may have four pins providing a common ground and connections to each of three lighted arrows or may have three pins only with common ground provided by attachment of cluster light to chassis of the land vehicle. The lights in a cluster light for indicating left turn movement, forward movement and right turn movement may be three single lights, three arrays of lights that are connected in parallel or arrays of Light Emitting Diodes connected in parallel. The central powering unit sends power flashes to the left and right turn arrow signals and provides a steady power to light arrows indicating forward movement for a time period ranging from about 0.5 minute to 1 minute.

The Multi-Directional Clustered Signal Light system provides a clear indication of intended movement of a driver to drivers of all surrounding vehicles, thereby providing an extra element of safety that helps to avoid accidents resulting from miscommunication between drivers. This low cost, efficient and reliable system eliminates the need for cut outs and lenses in sheet metals and complicated individual wiring for each of the bulbs. Manufacturing costs are decreased, and unit replacement costs, as well as maintenance and labor costs are reduced. The Multi-Directional Clustered Signal Light is installed as a single unit, facilitating its efficient installation and replacement.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Figure 1:
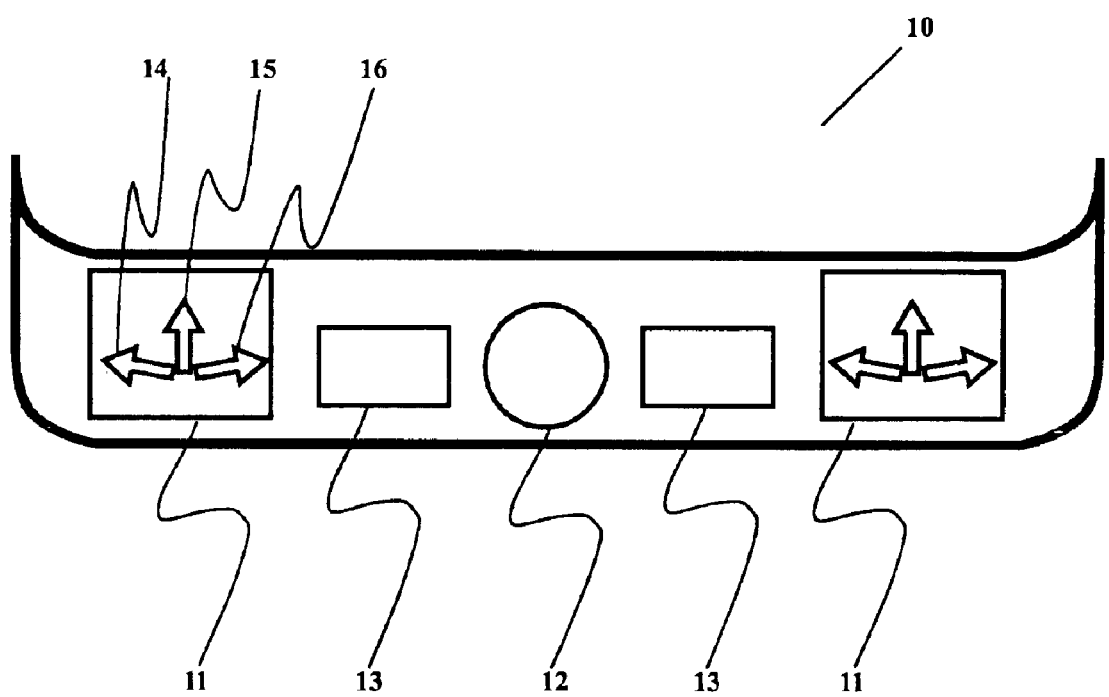
FIG. 1 is a schematic diagram depicting the Multi-Directional Clustered Signal Light System disposed on opposing left and right sides of a vehicle's rear bumper, which is, optionally, provided with a brake light a reversing illumination lamp.

The present invention provides a Multi-Directional Clustered Signal Light System located in the front and rear bumpers of a land vehicle such as an automobile, van, truck or the like. The system includes a unit having three distinct arrow indicators, which signal intended movement of the land vehicle to the left, forward or to the right. The rear bumper optionally may include a brake light and a reverse illuminating light. No provision is made on the vehicle's front bumper for a brake light or rear illuminating lights; these devices are optionally deployed at the rear portion of the vehicle.

The Multi-Directional Clustered Signal Light System unit is installed during manufacture of the vehicle in the front and/or rear bumper of a motor vehicle. It eliminates the need for turn lights and the like as cutouts in the sheet metal work or other material, and significantly reduces the cost of providing safe directional, brake and parking lights. In addition, this system provides one additional feature, namely, indicating to others that the vehicle intends to go straight instead of making any turns. The light system is provided in the form of a cluster light, which is affixed in a cavity located at the left and right sides of the vehicle's front and back bumpers. The cluster light has essentially three arrows, which are illuminated by corresponding lights. Illumination of the cluster light arrows may take the form of one or more lights for each arrow; or a set of light emitting diodes; or other lighting means. A colored glass or plastic window may be used to define the arrows. Optionally color-coding may be employed to unambiguously communicate intended movement of the vehicle. The left and right turn arrows may be color-coded blue and red, respectively, and the forward movement arrow may be color-coded green. The vehicle's rear bumper may carry other lights, which indicate braking or stopping functions, as well as lights to illuminate the path appointed for traverse when the vehicle drive shift is placed in reverse.

The cluster light carries at least three lighted arrows. A first of the lighted arrows signifies left-turn; a second lighted arrow signifies forward motion and a third lighted arrow signifies right-turn. The lighted arrows are powered by a central power unit, which connects to all cluster lights mounted on each side of front and rear bumpers using a single wired connection. The wired connection attaches to the cluster light by a single connector, which incorporates four pin connections, one for common ground and one for each of the lighted arrows. The common ground may alternatively be provided by connection of the cluster light to the chassis for the vehicle body, in which case a three-pin connector will be used to connect the central power unit to the cluster light. Since the cluster light is an integral unit, individual bulbs need not be wired-in. If the device fails, it can be readily replaced as a single integral unit, decreasing assembly and replacement costs. In some cases, the cluster light may include an array of lamps for a lighted arrow, or an array of light emitting diodes (LEDS) connected in parallel. This parallel connection of the lamps forms a single illuminating set that can comprise, for example, the left-turn signal. Preferably, the cluster light comprises a single unit, which is ready to be placed within a cavity in the bumper and connected by simple connectors having three connections and a ground connection. The rear bumper housing the Multi-Directional Clustered Signal Light System also contains back-up lights as well as brake lights.

The front face of the Multi-Directional Clustered Signal Light System comprises a design having the form of three arrows. These arrows signify intended directions of movement, such as "left", "ahead", and "right". When activated, these directional arrows are illuminated as flashing blue (left-turn), red (right-turn) and green (movement forward) lights. Forward motion is uniquely illuminated as a steady green light, which remains lit for a period of about 0.5 minute to 1 minute, thereby notifying other drivers concerning the vehicle's projected direction of movement, especially after the vehicle has stopped at an intersection. These signal lights are activated by the driver using a three-position switch. The left turn and right turn indications are provided by two of the positions, which are latching. The latch is released when a turn is completed as indicated by the steering wheel position. The switch position indicating the move forward signal is non-latching, and the central power unit turns on the move forward lighted arrow for a period of 0.5 minute to 1 minute. Advantageously, the Multi-Directional Clustered Signal Light System avoids problems produced, for example, by intersections wherein a double arrow directs traffic to the left or straight-ahead. It also alleviates confusion produced when a driver entering this type of intersection fails to signal trailing vehicles of his intention to turn left, and then proceeds to make a left hand turn. In all cases, the driver indicates the intention of movement by activating a switch in the steering column. The left turn and right turn directional indicators reset when the steering wheel is no longer turned or straightened following a left-hand or right-hand turn.

Further advantages and cost reductions are listed below:

1. Triple directional arrows promote safe operation of land vehicles. (Insurance rates should favorably reflect this result.)
2. Triple directional arrows would help decrease driving stress at busy intersections. (Driver frustration would lessen, thereby avoiding instances of road rage.)
3. Triple directional lights housed within vehicle bumpers transmit light through arrow-shaped openings therein at a height and location clearly visible to drivers of surrounding vehicles. (Protection afforded to light bulbs by the bumper-housing reduces breakage and replacement costs.)
4. Triple directional arrow cluster lights are within land vehicle bumpers. (This arrangement eliminates the need for glass lenses and reduces the cost of parts and replacement.)
5. Triple directional arrow cluster lights encased within bumpers can, optionally, contain back up and brake lights. (This arrangement reduces production and installation costs and increases system reliability.)
6. Triple directional arrow signal lights, and fines for not signaling, could be required by legislative mandate. (This would increase safety on federal and state highways.)

In FIG. 1 there is shown generally at 10 a schematic diagram of the Multi-Directional Clustered Signal Light System. A pair of cluster lamps 11 is disposed on opposing left and right sides of the rear bumper. Optionally, the bumper is provided with a brake light at 12, and reversing illumination lamps 13. Each cluster lamp 11 contains three arrow elements 14, 15 and 16, which represent left-turn, forward motion and right-turn. Arrow elements 14 and 16 are optionally colored blue (left-turn) and red (right-turn), and connected to appropriate flashing circuits. Arrow element 15 is colored green, and remains in the "on" condition for a period of 0.5 minute to 1 minute following actuation to indicate intended forward motion of the vehicle.

Figure 2:
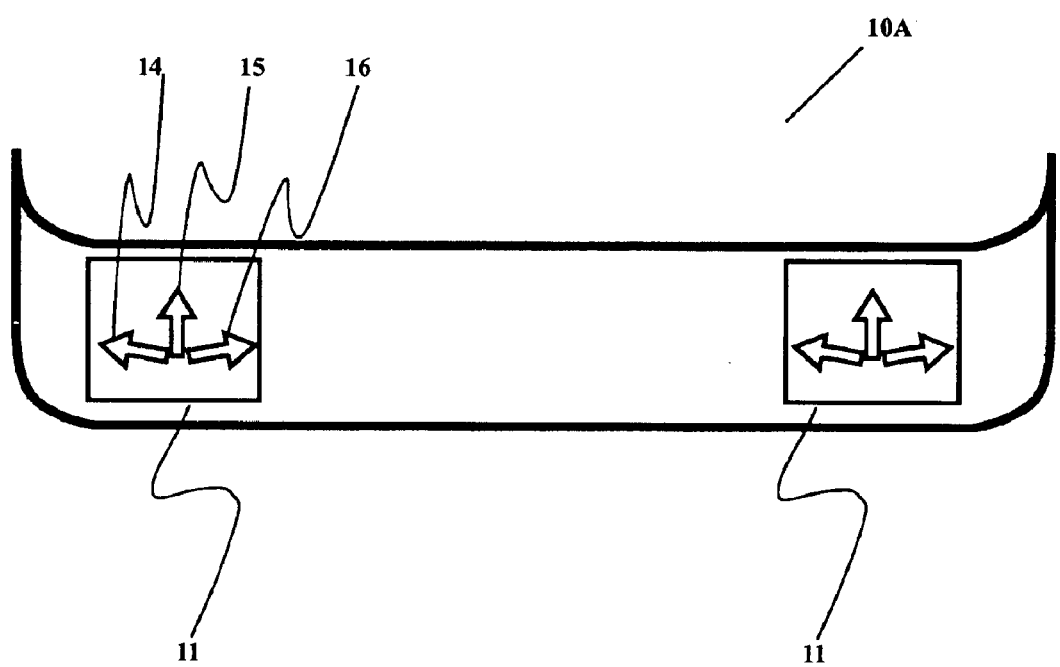
FIG. 2 is a schematic diagram showing the Multi-Directional Clustered Signal Light System disposed on opposing left and right sides of a vehicle's front bumper.

In FIG. 2 there is shown generally at 10A a schematic diagram of the Multi-Directional Clustered Signal Light System. Cluster lamps 11 are located at opposing left and right sides of the front bumper. Each cluster lamp 11 contains three arrow elements 14, 15 and 16, which represent, respectively, left-turn, forward motion and right-turn. Arrow elements 14 and 16 are optionally colored blue and red, respectively. They are connected to appropriate flashing circuits, which are triggered when the vehicle steering wheel is turned so that a point at the top of the wheel describes a distance greater than one-half the length of the wheel's circumference. Arrow element 15 is colored green and stays on for a period of 30 seconds to one minute following actuation to indicate intended forward motion.

Figure 3:
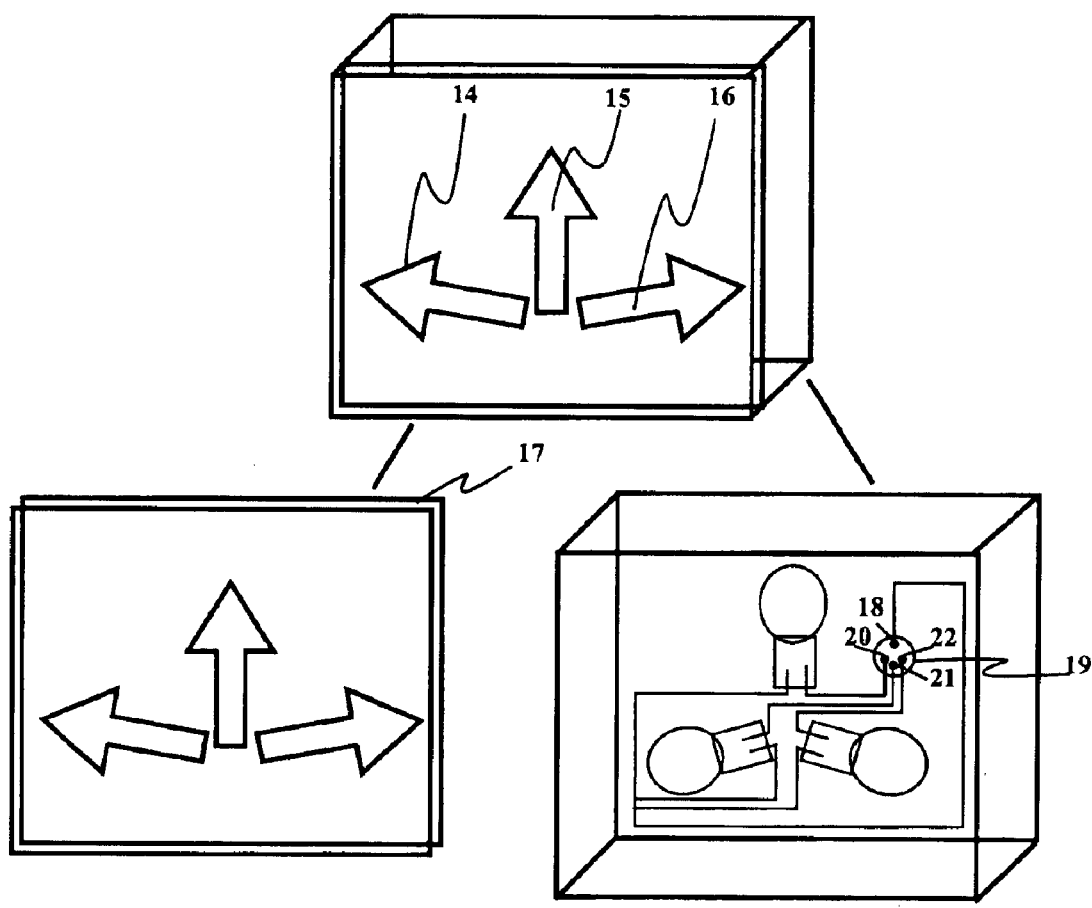
FIG. 3 depicts construction details of a cluster lamp wherein electrical connections are provided by a single connector unit.

In FIG. 3 the construction of the cluster lamp is shown in detail. The cluster lamp, in its simplest form, comprises three bulbs appropriately positioned to transmit light through openings in a bumper wherein it is housed. A lens covering the three bulbs comprises cut out arrows and a plurality of filter elements 17. Each bulb has 2 connections. A first of the connections makes electrical contact with a common ground; and is brought as a terminal 18 into the top pin of the connector. The other three terminals from the bulbs are brought to a connector 19, which mates with another connector from a central power unit through wiring. The left turn signal from lamp 14 is brought into terminal 20 of connector 19. Forward motion bulb 15 is connected to terminal 21 of connector 19. The right turn bulb 16 is connected to terminal 22 in the connector 19.

The Multi-Directional Clustered Signal Light System provides, in combination, the features set forth below:

Multi-Directional Clustered Signal Light System provides clear indication concerning left-turn, right-turn and forward motion of the vehicle. Cluster lights are efficiently located on either side of the front and rear bumpers. The cluster lights flash or stay lit to further differentiate the intended direction of motion. Preferably the system is packaged as a single cluster unit, accepting a single connection for rapid, low-cost installation, operation and replacement.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A Multi-Directional Clustered Signal Light system for land vehicles, comprising:
   a. a cluster light having three lighted arrows signaling left turn, move forward and right turn;
   b. a power source electrically connected to said cluster light for flashing said left turn and right turn lighted arrows;
   c. said power source being operative in response to initiated forward motion of said vehicle to illuminate said move forward arrow for a time period of about 0.5 minute to 1 minute;
   d. a latching switch means for triggering said left turn and right turn signals;
   e. a non-latching switch means for triggering said forward movement signal;
   f. a locating means for attaching said cluster lights proximal to opposing ends of the vehicle's front and back bumpers;
   g. a connecting means for establishing electrical connection between said power source and said cluster light with a single connector unit.

2. A system for land vehicles as recited by claim 1, wherein said lighted arrow signaling left turn is color-coded blue.

3. A system for land vehicles as recited by claim 1, wherein said lighted arrow signaling right turn is color-coded red.

4. A system for land vehicles as recited by claim 1, wherein said lighted arrow signaling move forward is color-coded green.

5. A system for land vehicles as recited by claim 1, wherein the said power source comprises a central power unit.

6. A system for land vehicles as recited by claim 1, wherein the said locating means for said cluster lights comprises a cavity within said bumper.

7. A system for land vehicles as recited by claim 1, wherein said connecting means comprises a four pin connector having a first pin for common ground and second, third and fourth pins for said three lighted arrows.

8. A system for land vehicles as recited by claim 1, wherein the said connecting means comprises a three pin connector having one pin for each of said three lighted arrows, said common ground connection being provided by attachment of said cluster light to said land vehicle chassis body.

9. A system for land vehicles as recited by claim 1, wherein each of said lighted arrows comprises a single light bulb.

10. A system for land vehicles as recited by claim 1, wherein each of said lighted arrow comprises an array of light bulbs connected in parallel.

11. A system for land vehicles as recited by claim 1, wherein each of said lighted arrows comprises an array of light emitting diodes connected in parallel.

12. A system for land vehicles as recited by claim 1, wherein said cluster light is replaceable as a single unit.

* * * * *